Figure 1:
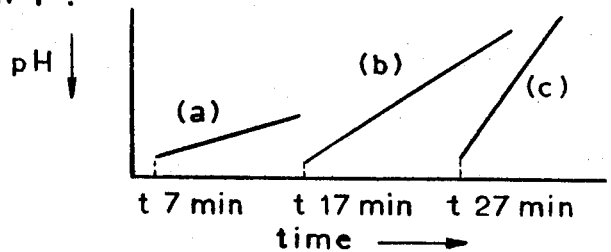

United States Patent [19]

Rabin et al.

[11] 3,816,263

[45] June 11, 1974

[54] BIOLOGICAL TEST

[76] Inventors: Brian Robert Rabin; David John Williams, both of Biochemistry Department, University College, Gower, London W.C.1., England

[22] Filed: Mar. 6, 1972

[21] Appl. No.: 232,013

[30] Foreign Application Priority Data
Mar. 16, 1971 Great Britain.................... 6963/71

[52] U.S. Cl.................. 195/103.5, 195/99, 195/65
[51] Int. Cl. .......................................... G01n 31/14
[58] Field of Search...................... 195/103.5 R, 100

[56] References Cited
OTHER PUBLICATIONS
Rabin et al., "Biochem. Soc. Symposia" 31:203–215, (1970).

*Primary Examiner*—Alvin E. Tanenholtz
*Assistant Examiner*—Max D. Hensley
*Attorney, Agent, or Firm*—Bacon & Thomas

[57] ABSTRACT

A method of testing a substance for carcinogenic activity which comprises contacting the substance with isolated cell membranes having masked rearrangase activity and after a predetermined interval of time testing the cell membranes for rearrangase activity. This method enables substances to be screened for possible carcinogenic activity. A test kit is also described.

7 Claims, 5 Drawing Figures

BIOLOGICAL TEST

This invention relates to a method of testing applicable to screening of substances to determine a class of toxic, and in particular carcinogenic and hepatotoxic properties therein.

It is of prime importance to ascertain whether drugs and other substances taken in by animals and human beings possess carcinogenic properties, which term is used hereinafter also to refer to hepatotoxic properties. At present the only tests available to determine carcinogenicity are time consuming, for example they involve the action of the test substance in living organisms and obervation over a considerable period of time to ascertain whether the tissue has become cancerous. Suspected substances are subjected to laborious test procedures since no quick reliable in vitro screening test has been available up until now capable of separating those compounds which are relatively harmless from those others which require further testing in living systems.

Tissues, in general, possess an enzyme which catalyses the rearrangement of disulphide bonds in proteins (henceforth called rearrangase) which is firmly attached to the cell membrane, for example in rat tissues this enzyme is found in both the rough and smooth components of the endoplasmic reticulum. In the rough reticulum the activity is normally masked by the membrane-bound ribosomes so that its enzymatic activity remains latent until the ribosomes become detached.

The membranes of the reticulum can be separated into two fractions, smooth membranes containing no bound ribosomes and rough membranes which possess attached ribosomes. The smooth membranes have full rearrangase activity which can be masked by causing ribosomes to become attached to the membranes. The rough membranes, if pure, contain rearrangase enzyme which is totally masked but can be activated by ribosome removal.

A number of carcinogens have been found to cause degranulation of the rough microsomal membrane and detachment of the ribosomes with consequent exposure of the active enzyme the rate of increase of which can be followed using a suitable assay.

The invention therefore provides a method of testing a substance for carcinogenic activity which comprises contacting the substance with isolated cell membranes having masked rearrangase activity and after a predetermined interval of time, testing the membranes for rearrangase activity.

The membrane preparation used in the test method is preferably derived from endoplasmic reticulum of rat liver, although reticular membranes from other sources may be employed. The reticular membranes are preferably ones in which the enzymatic activity of the rearrangase is masked by the ribosomes and thus becomes apparent when the ribosomes become detached. However, a preparation of reticular membranes containing no attached ribosomes may be used as described later.

In carrying out the test one therefore preferably begins with a reticular membrane with intact ribosomes.

The substance under test is incubated with the reticular membrane in both the presence and absence of NADPH (i.e., reduced Nicotinamide Adenine Dinucleotide Phosphate).

The purpose of the NADPH is to enable the "hydroxylase" in the microsomal membrane to function. It is believed that "hydroxylase" acts on some substances which are only carcinogenic after conversion by this enzyme. The test is therefore applicable not only to substances which have a direct carcinogenic activity but also to those which are in effect carcinogenic precursors, activated by "hydroxylase."

The cell membranes may also include some smooth membranes to supply microsomal hydroxylase.

The medium in which the reticular membrane is incubated is kept at a constant temperature and pH for a number of hours. At the end of the period the presence of a carcinogen will have led to the displacement of ribosomes from the reticular membrane and to the consequent unmasking of the activity of the enzyme rearrangase. The level of activity of this enzyme may then be estimated by reference to its capability of rearranging disulphide linkages in a selected protein containing random disulphide linkages. Randomly oxidized ribonuclease in which the cysteine sulphurs have been randomly paired may be used as the substrate for rearrangase and this material together with a mercaptan such as mercaptoethanol is added to the test mixture which is again incubated. Any rearrangase which has formed converts the inactive randomly oxidized ribonuclease into the active enzyme. Ribonuclease may be determined by a number of standard procedures described in the literature for example by changes in optical density (J. Biol Chem. 207 (1954) 201) or by changes in pH measured by a pH stat. (Biochim. Biophys. Acta 26 (1957) 502).

Ribonuclease can also be measured by its ability to hydrolyse cytidine 2'3' phosphate to cytidine 3' phosphate which procedure can be followed by measuring changes in optical density (Biochem J. 74 (1960) 234) or changes in pH.

Rearrangase can in theory be assayed by following the catalysed renaturation of any protein containing wrongly linked cysteine residues but ribonuclease has proved the most convenient because of the low rate of spontaneous reactivation and the number of standard techniques for estimating its activity. Soybean Trypsin Inhibitor could be used instead of ribonuclease in the test.

The percentage of the total latent rearrangase activity produced by the carcinogen can be obtained by calculation and can be used as a measure of the carcinogenic activity of the test substance.

The process according to the invention provides a simple and direct method for screening substances for carcinogenic activity. The various steps in the process can be standardised and the results obtained with materials of known carcinogenic activity can be calibrated so as to establish a reference by which the presence and relative degree of carcinogenic activity of any particular material can be estimated. The invention therefore has particular utility in manufacturing processes since it enables a manufacturer to determine whether materials which he proposes to use are potentially carcinogenic and thereby to control his manufacture as a result of such findings.

In an alternative test method according to the invention the membrane used is a smooth surface reticular membrane which has no attached ribosomes, but to which added ribosomes can be bound to the reticulum in the presence of a steroid hormone; for example, oestradiol for binding male ribosomes to male smooth surface membranes, and testosterone for female tissue. Oestradiol may be replaced by an extract of female ribosomes and testosterone by an extract of male ribosomes and both may be replaced by an extract of rough reticulum.

The smooth endoplasmic reticulum has a high rearrangase activity, and when ribosomes are bound to the reticulum in the presence of a steroid hormone, this enzyme activity is extinguished. If, however, the reticulum is treated with a carcinogen before an attempt is made to bind the ribosomes, then no binding occurs and hence no change in rearrangase activity occurs. An estimate of the rearrangase activity as described above may therefore be used as a measure of carcinogenic activity.

In a further aspect of the invention there is provided a test kit for use in determining possible carcinogenic activity in a substance which comprises:

a. NADPH or a system generating NADPH
b. A sucrose-magnesium chloride-potassium chloride tris buffer solution
c. A protein having random disulphide linkages capable of rearrangement by rearrangase to an enzymatically active form
d. 2-mercaptoethanol or an equivalent thiol
e. A substrate for measuring the degree of enzymatic activity of the rearranged protein (c).

The test kit is preferably sold with instructions to prepare a first solution by adding the substance being tested to (a); adding (b) to the resulting solution and adding isolated cell membranes having masked rearrangase activity; to prepare a second solution by making a solution of (c) in the presence of a suitable electrolyte and adjusting the pH to a predetermined value with a suitable base, and then adding (d) to the solution; to prepare a third solution by making a solution of (e) in a suitable electrolyte; and to add a sample of the first solution, after a predetermined time, to a sample of the second solution, and after a predetermined time to add a sample of the mixed solution to a sample of the third solution and to follow a predicted change in properties of the resulting solution to assay the degree of rearrangement of the protein (c), and thus the degree of degranulation of the rough microsomal.

The protein (c) is preferably randomly oxidised ribonuclease and the substrate (e) cytidine 2', 3' cyclic phosphoric acid or a salt thereof preferably the sodium salt. The suitable electrolyte for making up the protein (c) and the substrate (e) is potassium chloride or an equivalent electrolyte and a suitable base for adjusting the pH of the second solution is borax or an equivalent base. These may be included in the test kit as may be the isolated cell membranes.

In order that the invention may be more fully understood the following Examples are given, by way of illustration only:

EXAMPLE 1

This Example describes a test procedure according to the invention. In this test, 5 µg per ml of the test substance is added to male rough rat liver microsomal membrane containing approximately 10 mg of protein per ml in the presence of 1 mM NADPH, 50 mM Tris, (tris(hydroxy-methyl)aminomethane) 25 mM KCl, 5 mM MgCl$_2$ and 250 mM of sucrose. The rough microsomal membrane employed also contains some smooth membrane which provides the microsomal hydroxylase required to activate some of the carcinogens. Post microsomal supernatant liquor equivalent in volume to 10 percent of the above is then added and the test mixture is incubated for two hours at 20°C at a pH of 7.3.

A similar test mixture but containing no NADPH is also incubated to allow for the possibility that the carcinogenic activity might be destroyed instead of produced by the microsomal hydroxylase.

At the end of this period of time the percentage of the total latent enzyme activity which has been released is determined by its effect upon randomly oxidized ribonuclease.

Results obtained by the above procedure are shown in Table I below. Except where indicated the test substance was used at a concentration of 5 µg per ml and NADPH was present.

TABLE I

| Substance under test | % Total Enzyme Activity after 2 hours. | Carcinogenicity according to literature. |
|---|---|---|
| Naphthalene | 0 | Nil |
| 2-Naphthylamine | 0–5 | ± |
| Anthracene | 0 | Nil |
| 2,7-Diaminofluorene | 15 | + |
| 1,2-Benzanthracene | 10 | + |
| 1,2-Benzanthraquinone | 15 | + |
| 2-Aminochrysene | 15 | + |
| 6-Aminochrysene | 0 | Nil |
| 3-Aminopyrene | 17 | + |
| 3,4-Benzopyrene | 40 | + |
| Benzo-[b]-chrysene | 0 | Nil |
| 3,4,8,9-Dibenzpyrene | 25 | + |
| Carbon tetrachloride* | 15 | + |
| Aflatoxin B+$_1$ | 20 | + |

*15 µg per ml
+10 µg per ml Absence of NADPH

EXAMPLE 2

This Example describes the test procedure in more detail. The assay described here as in Example 1 involves the use of ribonuclease which has been chemically reduced and allowed to reoxidise. Because the disulphide bridges do not reform in their original positions, the enzyme is rendered inactive. Reactivation can be effected by the use of the rearrangase enzyme discussed above. Hence, if the rate of increase of active ribonuclease is followed, this will be proportional to the amount of degranulation.

The rate of increase of active ribonuclease is followed in this assay by the change in pH observed when ribonuclease hydrolyses cytidine 2', 3'-cyclic monophosphate.

1. Preparation of Reduced Ribonuclease 50 mg Ribonuclease (4 × recrystallised, 40–50 Kunitz units per mg) was added to 8 M-urea (1.3 ml) and the pH adjusted to ca 8.5 using methylamine. Mercapto-ethanol (0.05 ml) was added and nitrogen bubbled through the solution. This was sealed and incubated at 30°–35°C for 4–5 hours. The solution was then applied to a Sephadex (G–25) column and eluted using 0.1 M acetic acid. Fractions were collected and the OD of each tube was determined at 280 mµ. The fractions containing the reduced ribonuclease were combined and diluted using 0.1 M acetic acid to an OD of 0.500 at 280 mµ for use in the assay.

2. Oxidation of Reduced Ribonuclease

This was achieved by spontaneous oxidation. A period of 3 days was considered sufficient time for this process.

3. Preparation of Rat Liver Membranes

Solutions:

a) TKM buffer
   TRIS      50 mM
   KCl       25 mM
   MgCl$_2$   5 mM
   Adjust to pH 7.6 with HCl
b) 2M-sucrose in TKM
c) 0.25M-sucrose in TKM
d) 1.35M-sucrose in TKM Method:

Five animals were sacrificed, their livers removed and put into cold 0.25M-sucrose in TKM. The livers were cut into small pieces using scissors. The livers were homogenised using a Potter-Elvehjem homogeniser. The homogenate was centrifuged (15,000 g, 20 min. 4°C). The supernatant suspension was removed and the pellet discarded.

Fractionation of the membranes using a sucrose density gradient was carried out in 12 ml centrifuge tubes. The gradient was prepared by first pipetting 2.5 ml of 2.0M-sucrose into each tube and then layering 3 ml of 1.35 M-sucrose on the top. The remainder of the tube was filled with the membrane suspension, layering this carefully on to the gradient avoiding mixing of the layers. The tubes were centrifuged (120,000 g, 4 hrs. 4°C). This resulted in four main components. A red-coloured supernatant solution termed SII, smooth membrane found at the interface between 0.25M-sucrose and 1.35M-sucrose, rought membrane found at interface between 1.35M-sucrose and 2M-sucrose and a pellet of polysomes. The components were separated using a syringe and the rough membrane fraction was diluted approx. 1 → 2 using 0.25 M-sucrose in TKM. The suspension was centrifuged (120,000 g, 1 hr., 4°C) and the resulting rough membrane pellet resuspended in 0.25 M-sucrose in TKM (ca 6 ml).

4. Estimation of RNA in Membrane Preparation

From the membrane suspension, as obtained above, 2 × 100 μl samples were removed for an RNA estimation. To each of these 0.1N-perchloric acid (3 ml) was added and the tubes were put in ice for 10 mins. The tubes were centrifuged (low speed bench centrifuge) and the supernatant fluid discarded. 3N-KOH was added (3.2 ml) and the mixture was incubated for 1 hour at 37°C. After cooling the mixture in ice, 2.2N perchloric acid (0.8 ml) was added and the mixture allowed to stand for 5 mins. The suspension was centrifuged and the resulting supernatant solution was diluted at 1 → 2 with water. The OD (Optical Density) of this solution was determined at 260 mμ.

An OD of 0.1 = 256 μg/ml of original sample.

5. Estimation of Protein Content of Rough Membrane

The method used is that of Lowry and is carried out using a 1 in 50 dilution and a 1 in 100 dilution of the membrane suspension obtained as described in Section (3).

The following solutions are required:

A 2 percent sodium carbonate in 0.1N sodium hydroxide
B$_1$ 1 percent copper sulphate
B$_2$ 2 percent Na or K or KNa tartrate
B 1:1 B$_1$ + B$_2$
C 50 ml A + 1 ml B
D 1:2.5 in water Folin-Ciocalteu To 3 ml of solution C, 0.2 ml of membrane suspension was added. After incubation at room temperature for 15 mins., 0.3 ml of solution D was added and the mixture rapidly mixed. After 30 min. the OD was determined at 750 mμ. A sample of bovine serum albumin can be used as a standard for this method.

6. RNA-Protein Ratios

For a membrane preparation to be considered rough, the RNA-Protein ratio should fall within the range 0.14–0.19. This ratio clearly distinguishes these from the smooth, the RNA-Protein ratio of which is 0.02–0.03.

7. Carcinogen Assay

| Solutions required | |
|---|---|
| *Cytidine-2',3'-cyclic phosphoric acid sodium salt | 10mg/ml 0.1M KCl |
| Carcinogen | 1 mg/ml water or DMF*** |
| *Mercaptoethanol | 10 μl in 7 ml water |
| *Rough membranes | 10–20 mg protein/ml 0.25M-sucrose in TKM |
| KCl | 0.1M aqueous |
| Acetic acid | 0.1M aqueous |
| Borax solution | 0.05M aqueous |
| *NADPH | 5 mM in TKM |
| *Randomly oxidised ribonuclease | Solution having OD at 280 mμ of 0.500 in 0.1M acetic acid |

*Kept in ice
***DMF = Dimethyl formamide

Apparatus Required

The assay depends upon the change in pH of a solution of cyclic CMP during its hydrolysis by ribonuclease. Because this pH change is only of the order of 0.1 to 0.2 pH units, a scale expander must be coupled to a pH meter in order to obtain measurements at the level of accuracy required. The system used comprised an E.I.L., model 7030 pH meter. The pH meter was then connected through a "back off" arrangement to a recorder having a 10 mv full scale deflection. All pH measurements were carried out in a 5 ml water-jacketed cell which was maintained at 35°C.

Procedure a. Standardise pH meter using suitable buffers.

b. Preparation of degranulation mixture.

To 100 μl NADPH add 5–50 ug carcinogen and make up to 0.3 ml with TKM. Add to this mixture 0.2 ml of the membrane suspension and start timing the degranulation.

c. Preparation of Assay mixture.

To 0.65 ml of 0.1M KCl add 100 μl reoxidised ribonuclease and adjust pH to 7.0 using 0.05M borax. To this mixture add 50 μl mercaptoethanol and immediately after the degranulation has been initiated a 100 μl sample is taken and introduced into this mixture. A second clock should now be started. The pH of this mixture is now adjusted to pH 7.6 using the borax. This mixture should now be transferred to a second cell and incubated at 35°C.

d. Preparation of cyclic CMP solution.

Into the electrode cell put 0.9 ml KCl and add 100 μl cyclic CMP. Allow 2–3 mins. for equilibration.

e. Assay.

After the reactivation of the inactive ribonuclease initiated by step (c) has been proceeding for 7 mins. transfer a 100 μl sample into the cyclic CMP solution and switch the pH meter to the ΔpH scale. The rate of hydrolysis of the cyclic CMP can now be followed by the change of pH. $N_2$ should be blown over the surface of the reaction mixture to avoid atmospheric contamination and hence spurious changes. This assay should be repeated at 10 min. intervals up to about 40 mins. The gradient of the lines should gradually increase in concentration of active ribonuclease with time as more of the inactive form is reactivated by the rearrangase.

After 1 hour from the commencement of step (b), step (c) is repeated and the assay carried out again as described in step (e). This should be repeated again after a period of 2 hours.

The complete assay should be repeated in the absence of NADPH.

Interpretation of Results

The increase in amount of rearrangase exposed by degranulation has been measured after 1 hr. and 2 hr. and compared with a blank value at 0 hr. At each of these times the rate of increase in active ribonuclease has been measured by observing a series of rates of change of pH when cyclic CMP is hydrolysed by the ribonuclease.

Hence for each degranulation time $T_o$, $T_1$, $T_2$ a series of lines (a, b, and c) with increasing gradient is obtained. These are shown diagrammatically in FIG. 1 of the accompanying drawings for one value of T.

Figure 2:
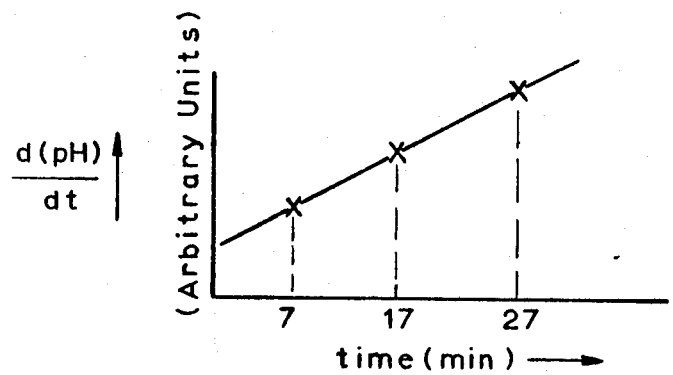

A graph is now drawn of the slope of a, b and c against the Time the sample was taken after ribonuclease assay. This is shown in FIG. 2 of the accompanying drawings.

Figure 3:
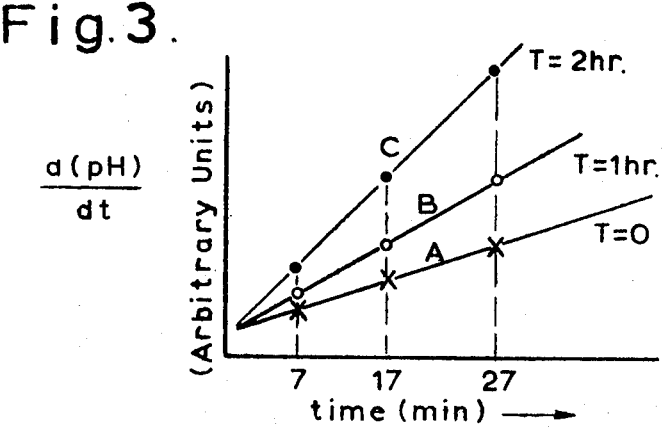

The two graphs above are obtained for T = zero, T = 1 hr. and T = 2 hr. and in the case of a positive assay, the overall result would be as shown in FIG. 3, of the accompanying drawings.

Finally a graph can be drawn using the gradients of A, B and C against a time axis of 0,1 and 2 hr. respectively.

In the case of a negative assay, since no degranulation is taking place, the amount of rearrangase is not increasing, and the rearrangase inherent to the blank (at T = 0) will decay with time (denaturation effect) and hence the gradient of C<B<A.

EXAMPLE 3

This is a specific Example describing the testing of a specific material.

Test substance is Aminopyrene at concentration of 5μg/ml. The primary incubation mixture (A) contains:

0.4 ml microsomal membrane preparation (rough membrane at concentration of 10 mg/ml)

0.1 ml NADPH (5m M)

5 μl solution (0.5 mg/ml aminopyrene in dimethylformamide)

Solutions were in buffer at pH 7.5 which contained:

250 mM sucrose 50 mM TRIS Base 25 mM KCl 5 mM Mg $Cl_2$

100 μl aliquots were removed from (A) at time t = 0, t = 60 and t = 120 minutes, into a secondary incubation mixture containing:

0.7 ml 0.1M KCl 0.10 ml randomly oxidised ribonuclease substrate (500 μg/ml in 0.1M acetic acid)

0.05 ml β - mercaptoethanol ($2\times10^{-2}$M)

0.05 M borate added to pH 7.6

This formed solution (B) and was kept at 32°C. 100 μl samples were removed from (B) at time t = 5, 12, 20, 28 and 35 minutes into 1 ml of a solution of cytidine - 2'3' - cyclicmonophosphate in 0.1M KCl (1mg/ml) and the pH of the solution was monitored for about 5 minutes using a strip chart recorder (full scale reading of Δ0.1 pH)

The rate of pH drift for each of the samples t = 5, 12, 20, 28 and 35 minutes were measured (see Table 2) and the rate of increase of pH drift for the samples taken from A at 0, 60 and 120 minutes were calculated as the "rearrangase" activities at these times.

TABLE 2

| | pH drift* | | |
|---|---|---|---|
| | T = 0 | T = 60 | T = 120 |
| t = 5 | 0.32 | 0.32 | 0.36 |
| t = 12 | 0.35 | 0.38 | 0.48 |
| t = 20 | 0.38 | 0.48 | 0.61 |
| t = 28 | 0.42 | 0.55 | 0.74 |
| t = 35 | 0.45 | 0.63 | 0.86 |
| Rate of increase of pH drift (arbitrary units) | 2 | 5 | 8 |

* = 80 × pH/min

Figure 4:
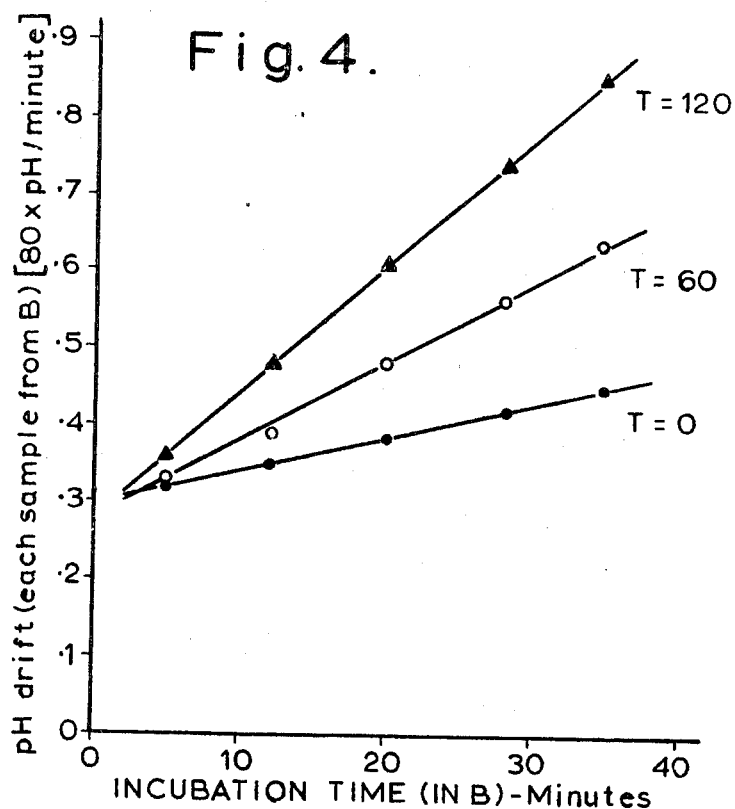

The pH drifts were plotted in FIG. 4 of the accompanying drawings to give the "rearrangase" activities i.e., gradient.

Figure 5:
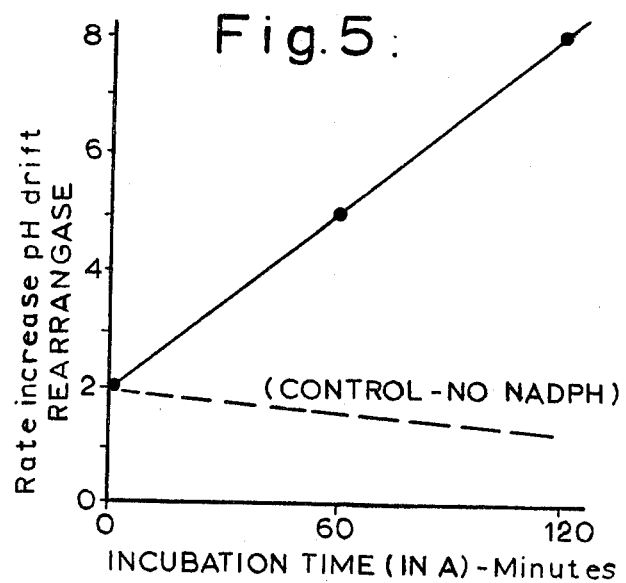

These "rearrangase" activities were then plotted against time of incubation FIG. 5 of the accompanying drawings to monitor the membrane - ribosome detachment.

Clearly the "rearrangase" activity increases with time so that the compound was judged to be "active."

We claim:

1. A method of testing a substance for carcinogenic activity which comprises the steps of:
   a. contacting the substance with isolated cell membranes having masked rearrangase activity in the presence of reduced nicotinamide adenine dinucleotide phosphate;
   b. after a predetermined time testing the cell membranes for rearrangase activity by their ability to rearrange disulphide linkages in an inactive randomly oxidised ribonuclease so as to yield active ribonuclease wherein the activity of the active ribonuclease is measured by following its hydrolysis of cytidine-2', 3'-phosphate to cytidine 3'-phosphate; and
   c. determining the carcinogenic activity from said degree of rearrangement.

2. A method of testing a substance for carcinogenic activity which comprises the steps of:
   a. adding, after a predetermined time, a sample of a solution comprising the substance to be tested, reduced nicotinamide adenine dinucleotide phosphate and isolated cell membranes having masked rearrangase activity and an RNA/protein ratio within the range of 0.14–0.19, in a sucrose-magnesium chloride-potassium chloride-tris (hydroxymethyl) aminomethane buffer solution, to a second solution, said second solution having been prepared by first making a solution of a protein having random disulfide linkages capable of rearrangement by rearrangase to an enzymatically active form in a suitable electrolyte, and thereafter adjusting the pH of said second solution with a suitable base, and then adding a mercaptan to said second solution
   b. adding a sample of the resulting mixed solution (a) after a predetermined time to a sample of a third solution comprising a substrate for measuring the degree of enzymatic activity of the rearranged protein in a suitable electrolyte;
   c. assaying the degree of rearrangement of the protein in the resulting solution; and
   d. determining the carcinogenic activity from said degree of rearrangement.

3. The method of claim 2 wherein the protein having random disulfide linkages is randomly oxidized ribonuclease and the substrate for measuring the degree of enzymatic activity is cytidine 2', 3'-cyclic phosphoric acid or a salt thereof.

4. The method of claim 3 wherein the suitable electrolyte is potassium chloride and the suitable base for adjusting the pH of the second solution is borax.

5. A test kit for use in determining possible carcinogenic activity in a substance which comprises:
   a. NADPH or a system generating NADPH
   b. A sucrose-magnesium chloride-potassium chloride tris buffer solution
   c. A protein having random disulphide linkages capable of rearrangement by rearrangase to an enzymatically active form.
   d. a mercaptan
   e. A substrate for measuring the degree of enzymatic activity of the enzymatically active form of said protein (c).

6. A test kit as claimed in claim 5 including isolated cell membranes.

7. A test kit as claimed in claim 5 in which the protein (c) is randomly oxidized ribonuclease and the substrate (e) is cytidine 2', 3'-cyclic phosphoric acid or a salt thereof.

* * * * *